United States Patent
Manning et al.

(10) Patent No.: US 10,536,340 B1
(45) Date of Patent: Jan. 14, 2020

(54) SPREAD PLACEMENT GROUPS

(71) Applicant: AMAZON TECHNOLOGIES, INC., Seattle, WA (US)

(72) Inventors: Stig Manning, Cape Town (ZA); Diwakar Gupta, Seattle, WA (US); Marnus Freeman, Rouxville (ZA); Georgios Elissaios, Seattle, WA (US); Joshua Dawie Mentz, Cape Town (ZA); André Mostert, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 547 days.

(21) Appl. No.: 15/359,467

(22) Filed: Nov. 22, 2016

(51) Int. Cl.
*G06F 15/177* (2006.01)
*H04L 12/24* (2006.01)
*H04L 29/08* (2006.01)
*G06F 9/455* (2018.01)

(52) U.S. Cl.
CPC ...... *H04L 41/0893* (2013.01); *G06F 9/45504* (2013.01); *H04L 41/0816* (2013.01); *H04L 67/1021* (2013.01); *H04L 67/1008* (2013.01); *H04L 67/1023* (2013.01)

(58) Field of Classification Search
CPC ....... G06F 9/45558; G06F 2009/45595; G06F 2009/4557; G06F 2009/45587; G06F 9/5077; G06F 2009/45562; G06F 2009/45575; H04L 63/20; H04L 67/10; H04L 41/12
See application file for complete search history.

(56) References Cited

U.S. PATENT DOCUMENTS

| | | | |
|---|---|---|---|
| 2012/0005346 A1* | 1/2012 | Burckart | G06F 9/5077 709/226 |
| 2013/0198740 A1* | 8/2013 | Arroyo | H04L 41/0806 718/1 |
| 2017/0003998 A1* | 1/2017 | Kelly | G06F 9/45558 |
| 2017/0097841 A1* | 4/2017 | Chang | H04L 67/10 |

* cited by examiner

*Primary Examiner* — Michael A Keller
*Assistant Examiner* — Thao D Duong
(74) *Attorney, Agent, or Firm* — Blank Rome LLP (57) ABSTRACT

A provider network determines which servers to use to host a group of virtual machines for a customer. A placement manager within the provider network employs a placement technique which prioritizes spreading virtual machines for the customer across different "subzones." A subzone is a logical division of a provider network's hardware and/or software denoting risk boundaries. By placing virtual machines in separate subzones, the customer's virtual machines and thus the task collectively performed by the virtual machines are less impacted by a failure within one of the subzones.

19 Claims, 6 Drawing Sheets

SPREAD PLACEMENT GROUPS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

In some public data centers, customers of the service provider may have little control or exposure to which physical servers are selected by the provider network to host the customers' virtual machines. Generally, the virtual machine placement service of the provider network selects servers to execute customer virtual machines so as to optimize resources of the provider network.

BRIEF DESCRIPTION OF THE DRAWINGS

For a detailed description of various examples, reference will now be made to the accompanying drawings in which.

DETAILED DESCRIPTION

Virtual machines may be placed into host computers automatically by the services of a provider network taking into account a number of parameters such as power, cooling, maintenance, network latency, throughput, and other factors. In some cases, a customer may have a group of virtual machines that the customer wishes to be launched. The system may respond to the request to launch the virtual machines of the group by selection of host computers on which to launch the virtual machines of the customer's group. Unfortunately, the resulting placement of the virtual machines may include multiple of the customer's virtual machines being executed on the same host computer, on different host computers that are connected to a common switch, or in other placement configurations for which the customer's virtual machines share a point of failure. For example, if two or more of the customer's virtual machines are launched on the same host computer, all of the virtual machines will become non-operational if the host computer on which they are executing becomes non-operational. In another failure mode example, the customer's virtual machines may be placed on different host computers within a rack of host computers, but yet host computers that are operationally connected to the same switch. A failure of that particular switch may render the virtual machines unable to send or receive network traffic over the shared failed switch.

The disclosed embodiments permit a customer to request a group of virtual machines to be launched with a "spread placement" strategy. A placement manager within the provider network will attempt to honor the spread placement strategy by placing the virtual machines of the group in different "subzones." A subzone is a logical division of a provider network's hardware and/or software denoting risk boundaries. That is, the failure of the hardware or software components in one subzone is not likely to affect the operation of other subzones. By launching virtual machines for a customer in separate subzones, the customer's virtual machines, and thus the task collectively performed by the virtual machines, are less impacted by a failure within one of the subzones as compared to launching multiple or all of the virtual machines in the same subzone.

A subzone can be defined within the provider network in a variety of manners. In some embodiments, a provider network includes multiple physical data centers, some of which may be logically combined into a virtual data center (also termed an "availability zone"). Each physical data center may include multiple equipment racks with each rack being a mechanical structure configured to house multiple computing devices such as servers configured to execute virtual machines for customers and other entities. Each rack may include one or more network switches termed "top of rack" (TOR) switches. Each TOR switch is cabled to one or more of the servers housed in the rack. In one example, a rack may accommodate 30 servers and three TOR switches, and each TOR switch can be communicatively connected to 10 servers. The numbers of servers and TOR switches in a given rack can vary in different embodiments and may vary from rack to rack. In one embodiment, a subzone is defined based on TOR switches. That is, each subzone boundary is defined by one TOR switch and the servers to which that switch is connected. In an example in which a rack has three TOR switches with a different set of servers connected to each TOR switch, three separate subzones are defined for that rack.

Subzones may be defined based on other aggregations of hardware or provider network resources. For example, subzones may be defined on the basis of higher level switch layers (e.g., higher level than TOR switches), individual racks, power domains, cooling domains, etc. For example, individual power distribution systems which supply electrical power to the hardware components of portions of a data center may define subzones. If the power distribution system fails, all of the hardware components (e.g., servers, switches, storage drives, etc.) that receive power from that power distribution system will be rendered incapacitated, but provider network components operating from other power distributions systems may continue to be operational. Similarly, subzones may be formed on the basis of cooling domains. Electronic components in a data center generate heat and are actively cooled to continue operating within specification. If the cooling system (e.g., heating, ventilation and air conditioning (HVAC)) fails, the components being cooled by that system may need to be powered down to prevent them from over-heating. However, other portions of the data center that are cooled by a separate cooling system may continue normal operation. Depending on how subzones are specified for a provider network, the placement manager executes a placement process which emphasizes placement of virtual machines on servers in separate subzones. If subzones are defined, for example, on the TOR switch basis, then the customer's virtual machines will be placed in servers that are coupled to different TOR switches. By placement of the customer's virtual machines in different subzones, the risk of a failure associated with one subzone will generally not affect the virtual machines executing in the other subzones.

The spread placement group strategy reduces the impact that single failures within a data center will have on the customer's application. A customer may create an application that includes various logic tiers such as a web tier set of virtual machines (a "front end" interface to a public network), a business logic tier, and a database tier. Each tier may include one or more virtual machines working together to implement the respective tier. Each tier thus comprises a group of virtual machines that collectively perform a given task. By requesting a spread placement strategy for the virtual machines configured to implement each tier, the risk is reduced that a failure that affects one virtual machine within a tier of the application will affect the other virtual machines within that same tier.

Figure 1:
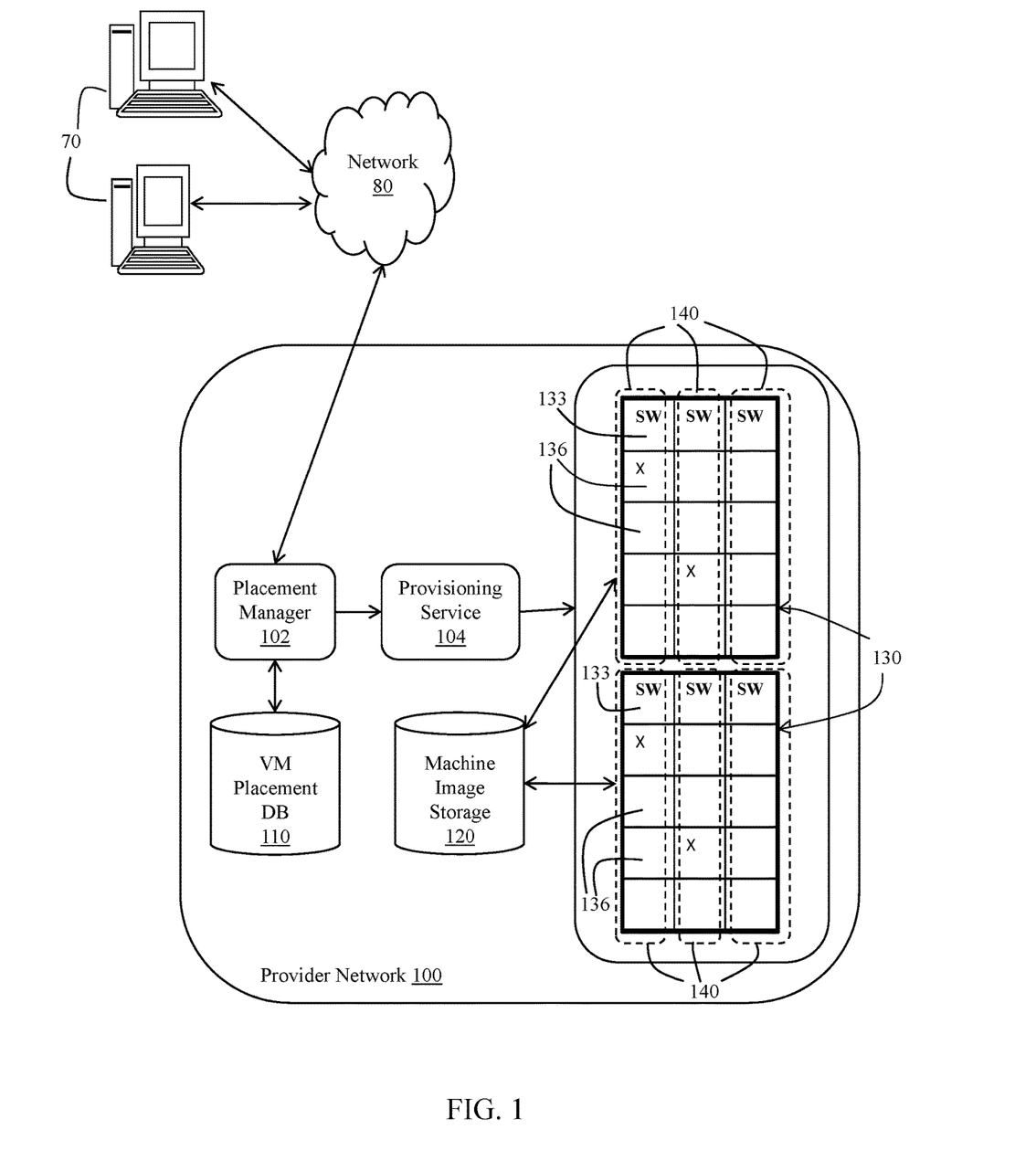
FIG. 1 shows a system implementing "subzones" in which the subzones align to "top of rack" switches in accordance with various examples.

FIG. 1 shows an example of a system in accordance with various embodiments for launching virtual machines on behalf of a customer of service provider on a spread placement basis. The system includes a provider network 100, which is accessible via one or more user devices 70 via a public network 80 (e.g., the Internet). The provider network 100 may include a placement manager 102, a provisioning service 104, virtual machine (VM) placement database 110, a machine image database 120, and a plurality of equipment racks 130. The placement manager 102 and provisioning service 104 may comprise program instructions executed on computing devices such as servers. The virtual machine placement database 110 and machine image storage 120 comprise information stored on persistent storage devices (e.g., hard disk drives, solid state storage drives, etc.). The user devices 70 may comprise personal computers (e.g., desktop computers, notebook computers, smart phones, etc.).

Each rack 130 includes mechanical structures into which computing devices can be installed. For example, servers 136 can be installed in the rack 130. The racks mechanically house their respective servers 136 and provide data and power support to each server. The example of FIG. 1 illustrates each rack having 12 servers 136 (or at least 12 mechanical receptacles into which servers can be installed). In other embodiments, a rack may house a different number of servers 136. Further, the example of FIG. 1 shows two racks 130, but in general any number of racks can be included as part of the provider network 100. Some service providers implement one or more data centers, and each data center includes multiple racks of servers. Some service providers may organize multiple physical data centers into logical data centers (also termed "availability zones"). A logical data center includes two or more physical data centers communicatively coupled by way of, for example, a private network.

Each rack also may include one or more switches 133 (also termed a "top of rack" switch in this disclosure, although the switches' location in the rack is irrelevant). In the example of FIG. 1, each rack 130 includes three switches 133. One or more servers 136 in the rack are communicatively connected to one of the three switches 133 for their network connectivity. For example, the four servers 136 illustrated in FIG. 1 below each switch 133 are connected to that switch. In accordance with the embodiment of FIG. 1, subzones represent individual switches 133 and the servers 136 connected thereto. The dashed boxes around each switch 133 and corresponding servers represent subzones 140. That is, in the example of FIG. 1, subzones are defined on the basis of top of rack switches 133. In the example shown, each rack includes three separate subzones 140. The "X" marks in the racks illustrates an example of the placement of virtual machines for a customer that specified a spread placement strategy. As shown, the customer requested four virtual machines to be launched all four virtual machines have been placed in different subzones 140 as shown.

Each server 136 may execute one or more virtual machines. A virtual machine is a software implementation of a physical computer system. Virtual machines may provide for multiple and/or different operating system environments to run concurrently on a single server having a processor and memory. In one example, multiple virtual machines of a Linux® operating system environment may execute concurrently with multiple instances of a Microsoft® Windows® operating system environment on a single physical computer. A virtual machine may include or interact with a hypervisor or a virtual machine monitor (or other type of virtualization system), which are programs that execute on the physical computer that allow multiple guest operating systems to share a single hardware host. Each operating system appears to have exclusive access to the host's processor, memory, and other resources. However, the hypervisor controls the host processor and resources, allocating what is needed to each instance's operating system in turn and making sure that the guest operating systems of the virtual machines do not disrupt each other. Each virtual machine may be controlled by a respective customer. Once the customer's virtual machines are created, the customer can load each virtual machine instance with whatever customer-specific applications the customer so chooses. The customer's applications may comprise web server applications, data processing applications, or any other type of back-end functionality that the customer wants to have executed.

Service provider customers may interact with the provider network in any of a variety of manners such as the submission of requests to application programming interfaces (APIs) through a command line interface, interaction with a customer console (which may result in the submission of API requests), submission of API requests through a script file, etc. Referring still to FIG. 1, a customer of the service provider may use his or her user device 70 to request the creation and launch of a group of virtual machines. A customer may request the creation of a group of virtual machines. The customer may want, for example, to launch a group of virtual machines to perform a particular task such as to provide a web interface, execute business logic functionality, implement a database, etc. The customer may request the creation of multiple virtual machines for a given task and may request that a particular number and type of virtual machines be grouped together for management purposes and to perform the task. Virtual machine types may vary in terms of amount of memory, number of central processing units (CPUs), type of operating system, whether mass storage is local or remote to the virtual machine, number of network ports, etc. The customer may create multiple groups of virtual machines—each potentially for a different purpose (e.g., to perform a different task or job). A list of the various groups specified by the customer may be viewed in, for example, the customer console rendered by a browser executing on the user device 70, or displayed as a result of an API request submitted by the customer to view a list of virtual machine groups. Each group may be assigned a unique identifier by the provider network and/or the customer may assign his or her own alphanumeric name to each group.

Once the customer has specified the number and types of virtual machines to be included in a particular group, the customer may submit, or cause to be submitted, an API request to the provider network to launch each of the virtual machines in a specific group while also specifying a placement strategy. Launching a virtual machine may include the selection of a server 136 to execute the virtual machine, downloading an appropriate machine image onto the selected server and booting the virtual machine from the downloaded machine image.

The customer may specify the placement strategy as, for example, an input parameter to an API request, selection of a radio button on a console, or in other manners. In accordance with the some embodiments, at least one placement strategy that a customer can specify is the spread placement strategy, which the provider network tries to honor by placement of the virtual machines of the group in different subzones.

The placement manager 102 of FIG. 1 may respond to the launch request provided by a customer and select the servers 136 on which to launch each of the virtual machines of the group in accordance with the requested spread placement launch strategy. Once the servers 136 are selected on which to launch the virtual machines in the various subzones, the placement manager 102 may submit a request (e.g., an API request) to the provisioning service 104 to cause the virtual machines to be launched on the corresponding servers. The provisioning service 104 may submit an API request to each selected server 136 to launch a virtual machine using a particular machine image, which may be stored in the machine image storage 120. The API request to the server 136 may include, as an input parameter, an identifier of the machine image, a customer account identifier, and possibly other information. In some embodiments, a software agent executing on the server 136 responds to the API launch request from the provisioning service 104 by downloading the specified machine image from the machine image storage 120. The machine image is then copied on to the storage drive of the server 136 and a virtualization system such as hypervisor may allocate resources such as memory, CPU, etc. to the virtual machine. The virtual machine then may be booted from the machine image.

For each virtual machine launched on a server, the placement manager 102 may create or modify a record in the virtual machine placement database 110 to identify the physical server that executes the virtual machine, and the subzone in which the server is located. An identifier is assigned to, or computed for, each subzone 140. In the example in which subzones align to individual TOR switches 133 and their corresponding servers 136, a subzone identifier may be a value that is calculated using the unique identifier of the TOR switch (which itself may be a random value, a serial number, or other unique switch identifying value). For example, the subzone identifier may be computed as a hash of the TOR switch identifier and one or more other parameters (e.g., a salt value). Any of a variety of hash algorithms can be used. In other embodiments, the TOR switch identifier itself may be used as the subzone identifier, rather than subzone identifier being calculated. The virtual machine placement database 110 stores mappings between, servers, individual virtual machines running on the servers, and the subzones in which each virtual machine is launched.

Figure 2:
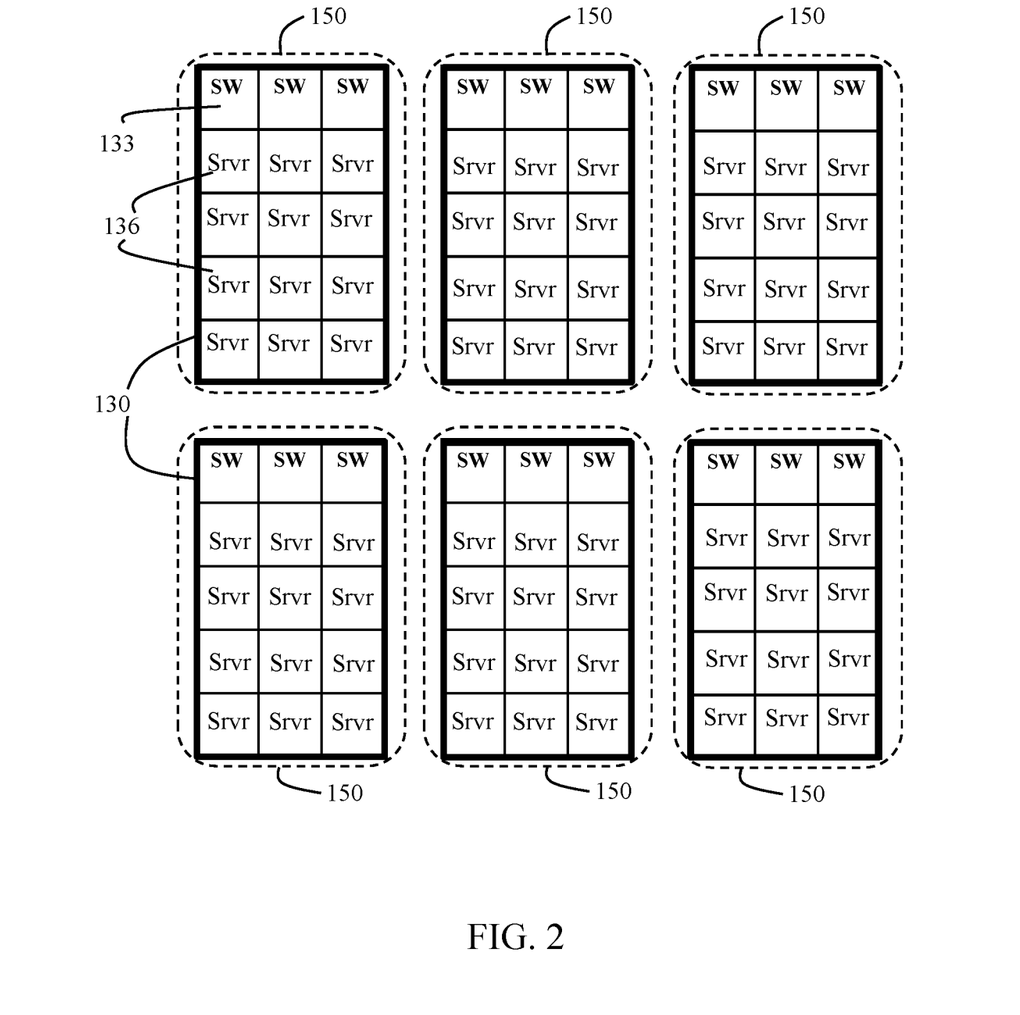
FIG. 2 shows an example of subzones aligned to individual racks in accordance with various embodiments.

In the example of FIG. 1, subzones are defined on the basis of individual top of rack switches 140. As such, all physical servers 136 connected to the same top of rack switch 133 are members of the same subzone. FIG. 2 shows an example of subzones defined on the basis of individual racks 130. As noted above, each rack may have multiple switches 133, and multiple servers 136 connected to each switch. Each rack itself may be assigned a unique identifier and each rack (and its constituent switches 133 and servers 136) may form an individual subzone. The subzones in the example of FIG. 2 are designated as dashed boxes labeled as 150. The placement server placing a customer's virtual machines in different subzones in the example of FIG. 2 would result in the virtual machines being launched on servers 136 in different racks 130.

Figure 3:
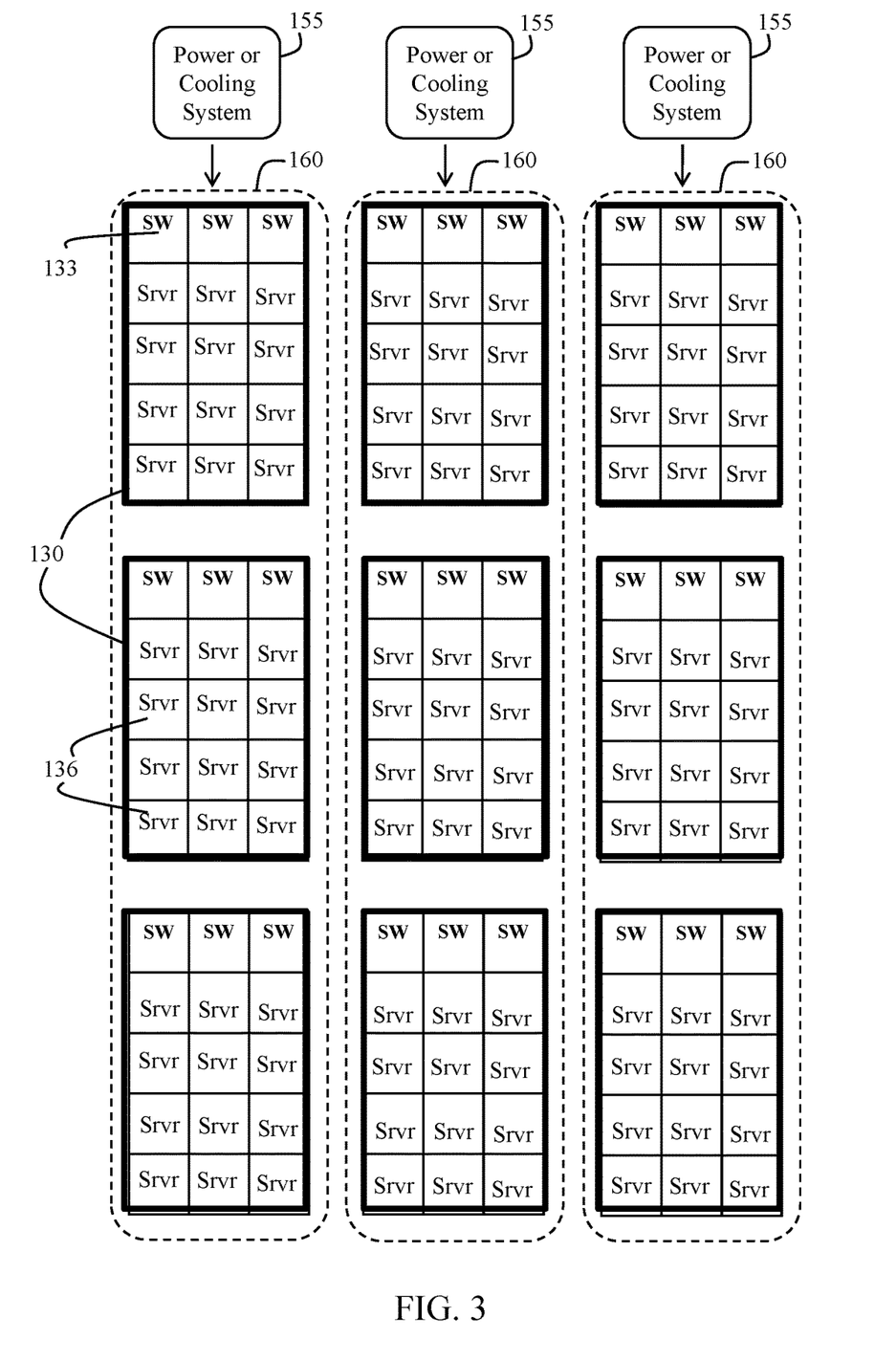
FIG. 3 shows an example of subzones aligned to power or cooling domains in accordance with various embodiments.

FIG. 3 illustrates yet another example of subzones. The computing devices (e.g., switches 133, servers 136, etc.) generate heat and generally need to be actively cooled by way of a cooling system. Any of a variety of cooling systems may be employed to cool a data center such as an air conditioning system, a liquid cooling system, etc. Depending on its size and the heat load generated by its computing devices, a data center may include multiple cooling systems. Each cooling system may be configured to cool a specific subset of the data center's computing devices. Each cooling system thus defines a cooling domain, which comprises those computing devices of the data center that are cooled by the cooling system. Each such cooling domain may represent a subzone. The example of FIG. 3 illustrates three cooling systems 155 and an associated cooling domain 160 for each such cooling system 155. Each cooling domain 160 may include multiple racks 130 as well as multiple switches 133 and servers 136 within each rack. A customer's group of virtual machines may be launched in different subzones and, if subzones are aligned to cooling domains 160, then in different cooling domains. As such, if the cooling system 155 of one cooling domain 160 were to fail, then the customer's virtual machines would not be affected.

Referring still to FIG. 3, subzones also can be defined on the basis of power delivery systems. A power delivery system may comprise a power supply, a single phase of a multi-phase power system, etc. (collectively a "power distribution system"). In this context, a power delivery system may provide direct current (DC) or alternating current (AC) power to the computing devices within a data center. An individual power delivery system may generate or otherwise provide the electrical power needed to operate a collection of computing devices. Thus, the domains 160 in FIG. 3 may comprise power domains for which a power delivery system provides electrical power. If a particular power delivery system were to fail and a customer's virtual machines were launched on servers 136 powered by separate power delivery systems, then the impact of the failed power delivery system would be limited to only the virtual machine launched on a server 136 connected to that particular power delivery system.

Any of a variety of spread placement techniques can be employed by the placement manager 102 to select the various servers 136 for executing virtual machines in the customer's group in different subzones. In one embodiment, the placement server 102 may identify those servers 136 that match the requirements of each virtual machine in a group to be launched. For example, the virtual machines of a particular group may require a certain amount of memory and certain number of CPUs and those servers that match those requirements may be identified by the placement manager 102. The virtual machine placement database 110 (or another database) may contain information that indicates the availability of the various servers, the various server configurations that are provided in the provider network, and the types of instances that can be launched on each server.

Figure 4:
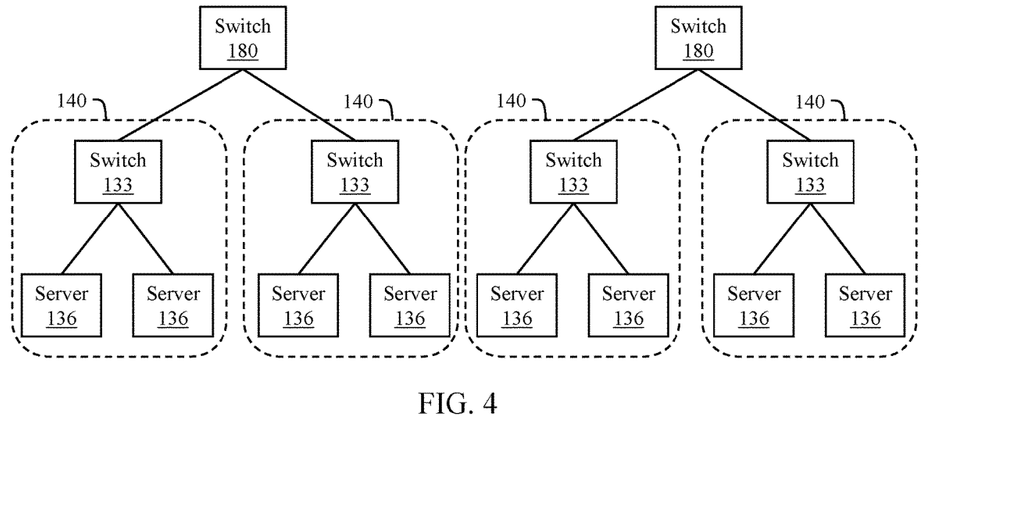
FIG. 4 shows an example of subzones implemented on the basis of top of rack switches in accordance with various embodiments.
Figure 5:
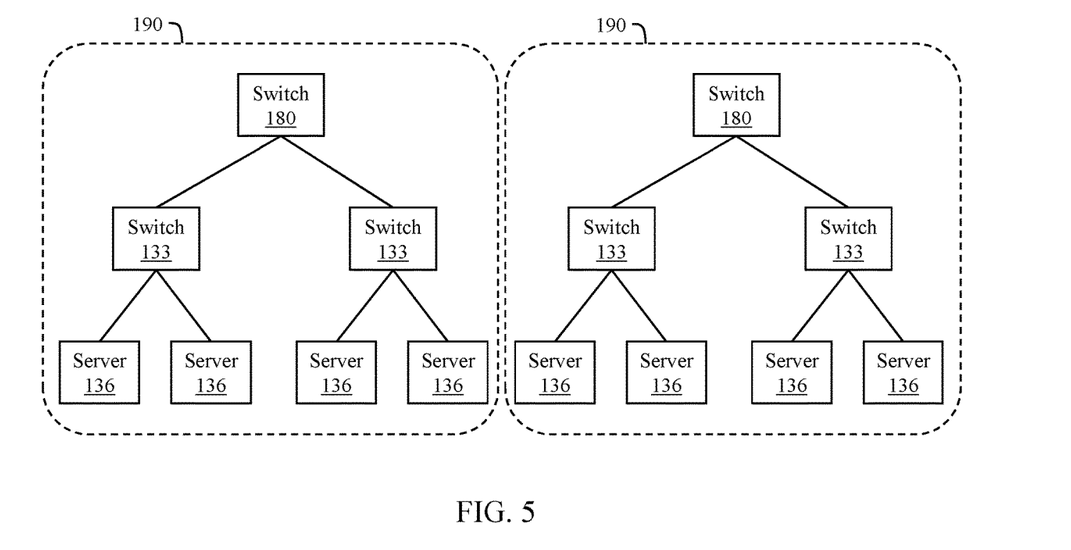
FIG. 5 shows an example of subzones implemented on the basis of higher level switches in accordance with various embodiments.

FIGS. 4 and 5 illustrate examples of subzones defined on various network level bases. The example of FIG. 4 is similar to that of FIG. 1. FIG. 4 illustrates servers 136 which can be used to host virtual machines for customers. Each pair of servers 136 is connected to a switch 133 which may be the top of rack switch described above. Two servers 136 are shown in this example as being connected to a given switch, but more than two servers may be connected to each switch 133. Switches 133 represent a first level of switches. Each switch 133 in turn may be connected to a switch 180. Each pair of switches 133 is shown connected to a common switch 180. Switches 180 represent a second or higher level of switches. Switches 180 in turn may be connected to a higher level of switches still, and so on. In the example of FIG. 4, subzones 140 are defined at the first switch level (i.e., top of rack switches 133). A spread placement strategy would cause the placement manager 102 to place a customer's virtual machines in servers 136 of different subzones 140 (i.e., in servers connected to different switches 133). In the example of FIG. 5, subzones 190 are defined at the second level of switches (i.e., switches 180). In this example, a spread placement strategy would cause the placement manager 102 to prioritize the placement of a customer's virtual machines on servers 136 of different subzones 190 (i.e., on servers connected through one or more first level switches 133 to different switches 180).

Figure 6:
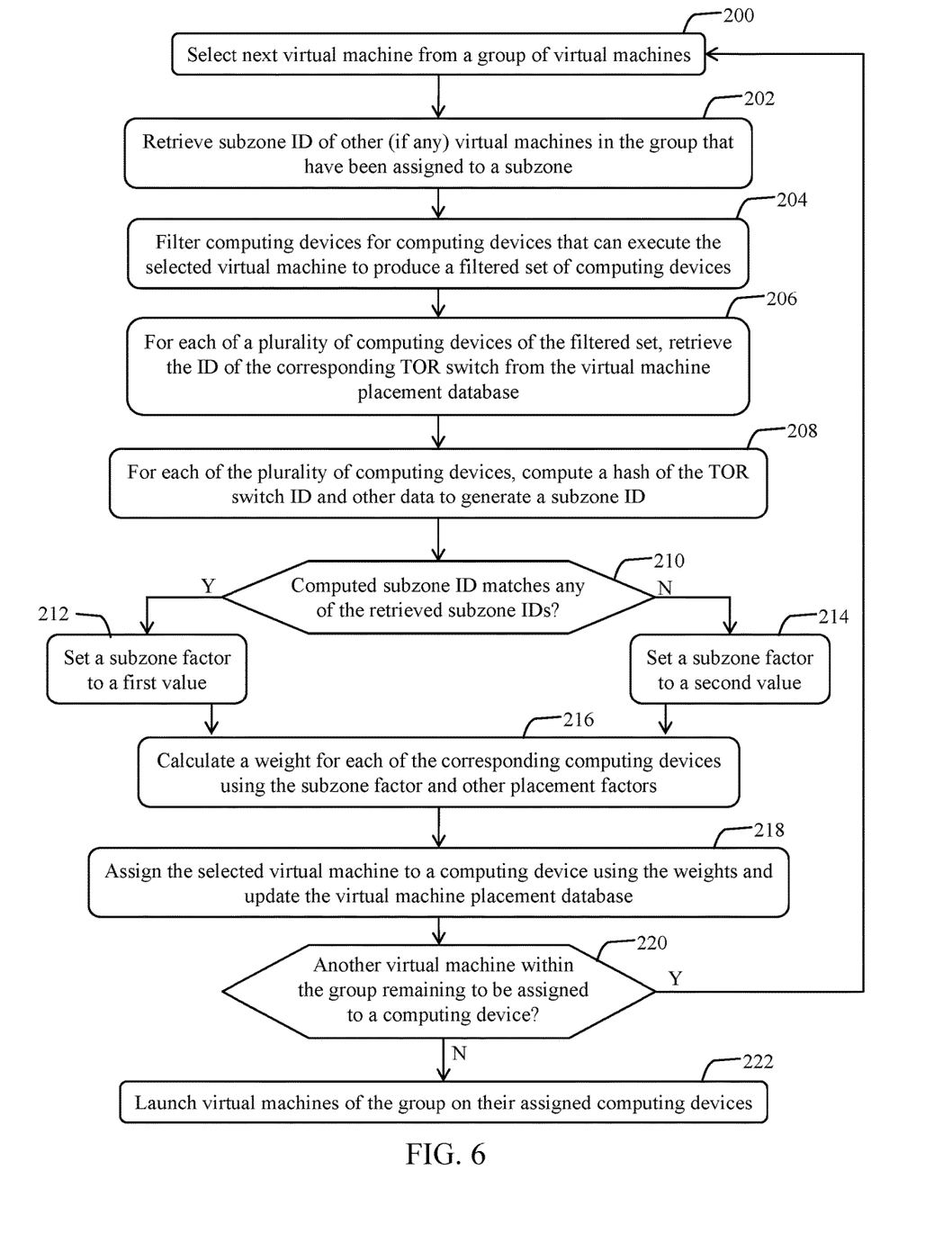
FIG. 6 shows a method in accordance with various embodiments.

FIG. 6 illustrates a method in accordance with an embodiment for launching virtual machines of a customer group into servers while honoring a spread placement strategy. The definition of a subzone can be any of the examples described above or other aggregations of network hardware. The operations shown in FIG. 6 can be performed in the order shown or in a different order. Further, the operations may be performed sequentially or two or more of the operations may be performed concurrently. The placement manager 102 generally may perform the operations shown in FIG. 6.

The customer has specified a plurality of virtual machines to be included in a group. Although the group might include only a single virtual machine, in general the group includes multiple virtual machines that are to be launched and executed on individual servers 136. The method sequentially matches each virtual machine to a particular server in the provider network. At 200, the method includes selecting the next virtual machine in the group to be placed on a server. At this point, the virtual machine has not actually been launched on a server 136 and the selection of the virtual machine refers to the selection of an identifier of the virtual machine and other information about the soon-to-be-launched virtual machine. Such information may include an identifier of a machine image to be used to boot the virtual machine, a virtual machine type, the type of mass storage to be used with the virtual machine, etc. The virtual machine selected may be the first virtual machine in the group. If the virtual machine selected is the second or subsequent virtual machine in the group, then a server 136 has already been selected to host another virtual machine of the group (or multiple servers have been selected to host multiple virtual machines). A placement record may have been added to the virtual machine placement database 110 that identifies the subzone in which the virtual machine was assigned.

At 202, the method includes retrieving the subzone ID of all other (if any) virtual machines in the group that have been assigned to servers 136 and thus to subzones. The subzone IDs may be retrieved from the virtual machine placement database 110 by the placement manager 102. Each virtual machine is assigned an ID and each subzone has a separate ID. Thus, each of the virtual machines in the customer's group that has already been assigned to a server by the placement manager 102 has a unique ID that the placement manager 102 can use to determine the ID of the subzone to which that virtual machine has been placed.

At 204, the method includes filtering the servers 136 for servers that can execute the virtual machine selected at 200. Virtual machines of a certain type, for example, may not be executable on all servers 136 within the provider network. A given virtual machine type may require a certain amount of memory or a certain number of CPUs for which only certain server configurations are satisfactory. A database accessible to the placement manager 102 may store metadata about each type of virtual machine available to customers and which server configurations are compatible with the virtual machine types. The placement manager 102 may access this database and then determine which servers 136 are available to accept a new virtual machine in the provider network and that are compatible for the selected type of virtual machine. At this point, the placement manager 102 has a filtered set of computing devices that potentially could function to execute the selected virtual machine (e.g., have both the capacity to accept another virtual machine and can execute the specified type of virtual machine).

At 206, for each of multiple computing devices of the filtered set from 204 (which may be all of the computing devices of the filtered set or a subset of the filtered computing devices); the method includes retrieving the ID of each such computing device's top of rack switch or other type of subzone delineator device or combination of hardware components. The top of rack switch ID may be retrieved by the placement manager 102 from a database that maps IDs of individual computing devices to their respective top of rack switch.

At 208, for each of the multiple computing devices of the filtered set, the method includes computing (e.g., by the placement manager 102) a hash of the top of rack switch ID and another value to thereby generate a subzone ID. Any of a variety of hash algorithms can be used to implement this operation. Further, the "other value" combined with the top of rack switch ID in the hash computation can be any of a variety of values including, for example, a salt value (which may be a random number) generated by the placement manager 102. The other value may be added to the top of rack switch ID, appended to it, or otherwise combined with the top of rack switch ID. The inclusion of the other value (e.g., salt) helps to further obfuscate the ID of the rack switch. The salt value may be unique to the customer thereby avoiding different customers having the same subzone ID even if their virtual machines are in the same subzone. In other embodiments, other computations besides a hash computation may be performed in operation 208. Further still, rather than computing a subzone ID based on, for example, a hash of the top of rack switch ID and an additional value, the subzone ID could be the top of rack switch ID. In yet other embodiments, the subzone ID may be pre-computed, that is, computed for receiving a request to launch one or more virtual machines of a group. In that case, operation 208 may include retrieving the pre-computed subzone ID from a data store such as the virtual machine placement database 110, Operation 208 includes the computation of a subzone ID using the top of rack switch ID. In this example, subzones are aligned to the top of rack switches. As explained above, subzone IDs may be aligned to other hardware devices, network switch aggregations, power or cooling systems, etc. As such, the computation of a subzone ID can generally be performed as in operation 208 but with the ID of the corresponding device on which the subzone is defined (e.g., IDs of higher switch levels, IDs of racks, IDs of power distribution systems, IDs of cooling systems, etc.) used instead of top of rack switch IDs.

At 210, for each of the multiple computing devices of the filtered set, the method includes determining whether the computed subzone ID matches any of the subzone IDs retrieved at 202. A match between the computed subzone ID from 208 and a retrieved subzone ID from 202 means that a virtual machine from the customer's group has already been assigned to computing device in the same subzone as a candidate computing device for which a subzone ID was computed at 208. If a match between subzone IDs is detected at 210, then at 212 a subzone factor is set to a first value. If no match between subzone IDs is detected at 210, then at 214 the subzone factor is set to a second value. In some embodiments, the first value is smaller than the second value which, as is explained below, causes a weight for the candidate computing device to be smaller than would have been the case if the second value was used to compute the weight. A computing device with a smaller weight renders that computing device less likely to be selected for hosting the customer's virtual machine.

At 216, the method includes calculating (e.g., by the placement manager 102) a weight for each of the corresponding computing devices using the subzone factor as well as other placement factors. The subzone factor is either the first value or the second value as explained above. The other placement factors may include any of a variety of factors such as whether another virtual machine is already hosted on the computing device, scheduled upcoming maintenance events for certain servers, CPU utilizations in certain parts of the provider network, etc. A separate weight is computed for each of the plurality of computing devices of the filtered set based on a variety of placement factor and including a subzone factor that accounts for whether a given computing device is in the same subzone as one of the customer's other virtual machines whose placement has already been determined.

At 218, the method includes assigning the selected virtual machine to one of the plurality of computing devices of the filtered set using the weights calculated for each such computing device. In an embodiment in which the first value is smaller than the second value for the subzone factor (i.e., a smaller value indicating the computing device is part of the same subzone as one of the customer's other virtual machines), the weight for the computing device will be smaller than it would have been had the placement manager 102 determined the computing device not to be in the same subzone as another of the customer's virtual machines. In some embodiments, the computing device having the largest weight is selected to be assigned the selected virtual machine. As such, the subzone factor is used in the virtual machine placement algorithm to influence the placement manager 102 to select computing devices that are in different subzones for assignment of the virtual machines of a customer group of virtual machines. Assigning the selected virtual machine to a computing device may comprise updating a record in a database such as the virtual machine placement database 110 to map together the IDs of the virtual machine and the computing device. The placement service also may update the virtual machine placement database 110 to reflect that the virtual machine has been assigned to a particular computing device and that the computing device is in a particular subzone. In some examples, the ID of the virtual machine and of the subzone to which the virtual machine is assigned are recorded in the virtual machine placement database 110 and used in the placement decision of other virtual machines in the group as explained above.

If another virtual machine in the customer group remains yet to be assigned to a computing device (as determined at 220), then control loops back to operation 200 and the process repeats for a newly selected virtual machine. Otherwise, if all virtual machines of the customer's group have been assigned to computing devices, then at 222 the method includes launching or causing to be launched the virtual machines of the group on their newly assigned computing devices. In some embodiments, the virtual machines of the group are all launched at one time after their placement decisions have been made. In other embodiments, each virtual machine may be launched immediately after its placement decision and before placement decisions have been made for other virtual machines in the group. In some cases, a customer can request one virtual machine of the group to be launched and the placement logic 102 in the example of FIG. 6 can be performed to place that virtual machine. Then, when the customer requests another virtual machine in the group to be launched, the placement manager 102 again performs the placement logic of FIG. 6. In some embodiments, launching the virtual machines may be performed by the provisioning service 104 upon request from the placement manager 102. For example, the placement manager 102 may issue an API request to the provisioning service 104 to launch the virtual machines on specified computing devices. The identifiers of the virtual machines to be launched, identifiers of the computing devices, the machine images to use, configuration parameters, and other launch parameters may be included as input parameters to the API request submitted to the provisioning service 104. In some embodiments, the placement decisions made by the placement manager 102 and the launch functionality performed by the provisioning service 104 may be performed by one service—that is, the placement and launch operations may be performed by the same service.

In one example of launching a virtual machine, the provisioning service 104 submits an API request to each of the computing devices selected during the virtual machine placement process to launch a corresponding one of the virtual machines of the customer's group. The API request may include, as an input parameters, information usable to obtain a machine image (e.g., volume information, cryptographic keys, etc.). The request may also include other information such as virtual machine type, customer ID, security group information, etc. A software agent on the computing device may respond to the request by, for example, downloading the corresponding machine image from the machine image storage 120 or sending a request to a the machine image storage to mount a volume). Once the machine image is provided to the computing device, the virtual machine may be booted.

The virtual machine placement example of FIG. 6 illustrates a placement technique which attempts to spread virtual machines across separate subzones. However, because subzone factor is one of multiple factors considered in the placement technique, it is possible that two virtual machines of a customer group may be placed in the same subzone. Colocation of virtual machines in the same subzone may occur if the provider network is already densely populated with virtual machines and the number of choices of computing devices for hosting virtual machines is relatively small. In some embodiments, the placement technique prioritizes placing virtual machines in separate subzones, but may prioritize placement of two or more of a customer's virtual machines in the same subzone over failing to place and launch the virtual machines due to a subzone colocation issue.

Following placement of the virtual machines (before or after launching the virtual machines), the resulting placement decisions are presented to the user via a console or as the result of an API request (e.g., a DescribeInstances API) to view the virtual machine placements. The response to this API request may include the subzone ID for each virtual machine along with the ID of the virtual machine itself. The user may opt to cancel the placement (possibly requesting the placement manager try again to place the virtual machines), or accept the placement decisions despite two or more the virtual machines being located in the same subzone.

In some embodiments, the specification for subzones may be predetermined and static. That is, subzones may be specified to be aligned with a type of hardware device (e.g., top of rack switches, racks, etc.) by, for example, a user interface in which a network professional or other personnel enter the specification for subzones. In one example, choices of subzones may be presented to the user in a drop-down menu or as a set of radio buttons and the user specifies the type of subzones to use for the provider network, or at least a portion of the provider network. The specification of subzones is provided to the placement manager 102 for use in placing virtual machines across servers as explained above.

In other embodiments, subzone definitions may be determined through execution of program instructions that take into account one or more of a variety of factors related to the provider network. The program instructions may be part of the placement manager 102, the provisioning service 104, or another service within the provider network. In one example, the subzone specification may be a function of the size of the provider network. The size of the provider network may be specified in terms of number of computing devices, number of racks, number of switches or routers, etc. Thresholds may be specified for the provider network size which, when exceeded, causes the program instructions to change the specification for subzones. The change may occur automatically or require human confirmation through, for example, a user interface. The change in subzone specification may be provided to the placement manager 102 for use in placing virtual machines from that point forward.

A change in the subzone definition may be a narrowing change or a broadening change. An example of a narrowing change is from a rack level to a top of rack switch level. An example of a broadening change is the opposite, that is, from a top of rack switch level to a rack level. For a change in the specification of a subzone from a broader to a narrower specification, all virtual machines that had been placed and launched on computing devices in accordance with the broader definition of subzones will still comply with the narrower definition of subzones. That is, if the former subzone specification was at the rack level, then all virtual machines of a group will be launched on computing devices of different racks (assuming full compliance with the spread placement request was possible). This means that, not only are the virtual machines in different racks, but they are also executing on computing devices connected to different top of rack switches. If the subzone specification subsequently changes to a top of rack switch level, then the currently executing virtual machines are still considered spread across different subzones.

On the other hand, if the specification for subzones were to change from a narrower to a broader specification, then virtual machines that were successfully spread across different subzones may end up being in the same subzone after the change. For example, if the virtual machines were placed using a spread placement strategy with a subzone specification aligned to top of rack switches, two virtual machines of a customer may group could be placed in the same rack but on computing devices connected to different top of rack switches. If the subzone specification changes to a rack level-based specification, then the two virtual machines executing in the same rack would suddenly be in the same subzone.

In some embodiments, upon being configured for a new subzone specification or dynamically determining a new subzone specification, the placement manager 102 may access the virtual machine placement database 110 to determine the location of the various virtual machines for a given customer. If the placement manager 102 determines that two or more of the customer's virtual machines, which previously were in different subzones, are now in the same subzone, the placement manager may opt to place one of the virtual machines in a different computing device in a different subzone. The placement manager 102 may migrate, or request that the provisioning service 104 migrates, the virtual machine to a different computing device in a different subzone. The migration may involve launching a new virtual machine on another server using the same machine image as was used to launch the currently executing virtual machine, copying the content of memory from one virtual machine to another, remapping a storage volume to the new virtual machine, moving an elastic IP address from the currently executing virtual machine to the new virtual machine, etc.

In one embodiment, the process illustrated in FIG. 6 may be executed to re-assign one or more of the virtual machines to new subzones to cause the virtual machines of a customer group to be spread across different subzones. For example, a customer group may have 5 virtual machines spread across different subzones. The subzone specification may change such that three of the virtual machines are in different subzones and two are in the same subzone. By migrating one of the two co-located virtual machines to a new subzone different from the remaining four of the group, the customer's group will again be in full compliance with the spread placement strategy. One of the two co-located virtual machines may be selected, for example, at random. The selected virtual machine may be processed through the logic of FIG. 6 and assigned to a new computing device in a subzone different from the remaining four executing virtual machines.

In some embodiments, the placement manager 102 may end up placing two or more virtual machines of a customer group in the same subzone, for example, due to availability constraints). In such cases, at a later point in time (e.g., an hour later, a day later, etc.) the placement manager 102 may attempt to re-locate the co-located virtual machines so as to spread them across different subzones. For example, if two virtual machines are located in the same subzone, the placement manager 102 may reprocess one of those virtual machines through the logic flow of FIG. 6 in an attempt to place it in a different subzone. If a different subzone can be found, the placement manager 102 causes the virtual machine to be migrated.

Figure 7:
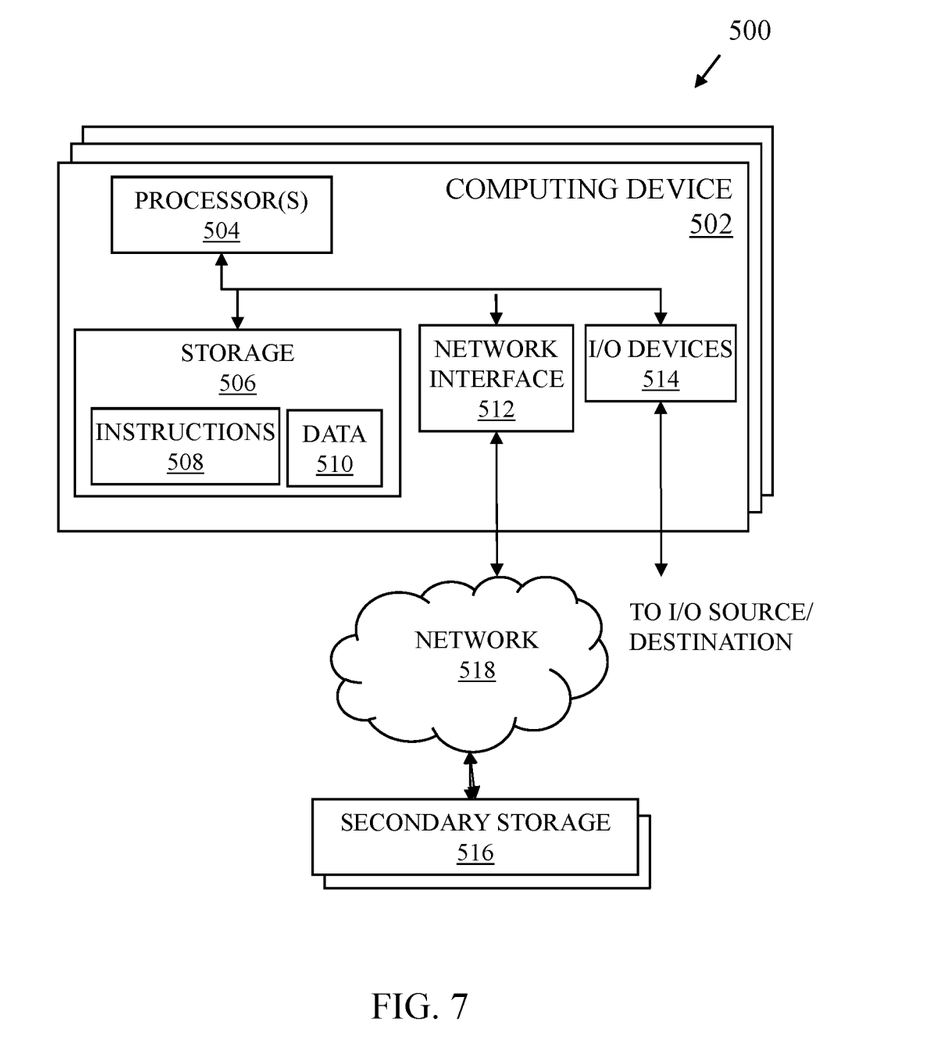
FIG. 7 shows a block diagram of a computing device in accordance with various embodiments.

FIG. 7 shows a schematic diagram for a computing system 500 suitable for implementation of any of the placement manager 102, provisioning service 104, and databases as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services and databases described herein.

Each computing device 502 includes one or more processors 504 coupled to a storage device 506, network interface 512, and I/O devices 514. In some embodiments, a computing device 502 may implement e functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/UM-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the placement manager 102, provisioning service 104, databases, and other components described herein may be implemented as separate computing devices 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a plurality of computing devices configured to execute virtual machines within a service provider network, the computing devices organized into subzones; and
   one or more computing devices configured to execute a placement manager;
   wherein, in response to a request to launch a virtual machine of a customer group of virtual machines within the service provider network and for each of multiple computing devices of the plurality of computing devices, the placement manager is configured to:
      compute an identifier of the subzone of the respective computing device;
      compute a subzone factor as a function of whether another virtual machine of the group has the same or different computed subzone identifier; and compute a weight for the computing device using the computed subzone factor and another virtual machine placement factor; and wherein the placement manager is further configured to select a computing device from among the multiple computing devices using the computed weights and cause the virtual machine to be launched on the selected computing device.

2. The system of claim 1, wherein the placement manager is configured to compute the subzone identifier as a hash of an identifier of a hardware component combined with another value.

3. The system of claim 2, wherein the hardware component is a switch.

4. The system of claim 1, wherein the subzones are at least one of: a group of computing devices connected to a common switch, a switch aggregation layer, a power domain configured to control power to a group of computing devices, a cooling domain configured to cool a group of computing devices, a rack housing a group of computing devices, and a plurality of racks.

5. The system of claim 1, wherein each subzone comprises a switch and a plurality of computing devices coupled to the switch, wherein the switch has an identifier, and wherein the placement manager is configured to compute the identifier of the subzone of the respective computing device through computation of a value using the identifier of the switch.

6. A system, comprising:
a plurality of computing devices configured into a plurality of subzones within a provider network, wherein each subzone has a subzone identifier that is computed from an identifier of a provider network component and an additional value; and
one or more computing devices configured to execute a placement manager;
wherein, in response to a request to launch a virtual machine of a plurality of virtual machines, the placement manager is configured to compute a subzone identifier for each of multiple computing devices of the plurality of computing devices, compute a subzone factor for each of the multiple computing devices based on whether another virtual machine of the plurality of virtual machines is assigned to the same subzone identifier, and select a computing device from among the multiple computing devices of the plurality of computing devices to execute the virtual machine of the launch request;
wherein the selection of the computing device is based, at least in part, on whether another virtual machine of the plurality of virtual machines is assigned to a computing device in a subzone having the same subzone identifier as the selected computing device.

7. The system of claim 6, wherein the subzones are at least one of: a group of computing devices connected to a common switch, a switch aggregation layer, a power domain configured to control power to a group of computing devices, a cooling domain configured to cool a group of computing devices, a rack housing a group of computing devices, and a plurality of racks.

8. The system of claim 6, wherein the placement manager is configured to:
compute, for each of the multiple computing devices, a weight for the computing device using the computed subzone factor and another placement factor, and
for each virtual machine of the plurality of virtual machines, the placement manager is configured to select the computing device using the computed weights and to cause the virtual machine to be launched on the selected computing device.

9. The system of claim 6, wherein the placement manager is configured to compute each subzone identifier as a hash of the provider network component and an additional value.

10. The system of claim 9, wherein the additional value is a salt value.

11. The system of claim 10, wherein the provider network component is one of: a switch, a power distribution system, a cooling system, and a rack.

12. The system of claim 6, wherein the placement service is configured to determine whether a characteristic of the provider network exceeds a threshold and, in response, to change a specification of the subzones to a different type of provider network component.

13. The system of claim 12, wherein the placement service is configured to, as a result of the change in the subzone specification, determine that a plurality of executing virtual machines of a customer group are in the same subzone and migrate at least one of the virtual machines in the same subzone to a computing device in a different subzone.

14. A method, comprising:
selecting a virtual machine from a group of virtual machines;
retrieving a subzone identifier of each of one or more other virtual machines of the group that have been assigned to computing devices;
for each of a plurality of computing devices, retrieving an identifier of a corresponding hardware component that defines subzones, computing a subzone value using the retrieved hardware component identifiers, setting a subzone factor based on whether the computed subzone value matches any of the retrieved subzone identifiers, and calculating a weight using the subzone factor and other placement factors; and
assigning the selected virtual machine to a particular computing device of the plurality of computing devices using the calculated weights.

15. The method of claim 14, wherein computing the subzone value comprises computing a hash of the retrieved hardware component identifier combined with another value.

16. The method of claim 14, further comprising updating a database to specify the selected virtual machine and an identifier of a subzone containing the computing device to which the selected virtual machine was assigned, and wherein retrieving the subzone identifier of another virtual machine of the group that has been assigned to a computing device includes retrieving the subzone identifier from the database.

17. The method of claim 14, wherein retrieving the identifier of the corresponding hardware component that defines subzones comprises retrieving an identifier of at least one of: a switch, a rack, a power distribution system, and a cooling system.

18. The method of claim 14, further comprising changing the definition of subzones and, as a result of changing the definition of subzones, determining that executing virtual machines of a customer group are in violation of the changed subzone definition and migrating at least one virtual machine from one computing device to another to negate the violation.

19. The method of claim 14, wherein setting the subzone factor comprises setting the subzone factor to a first value when the computed subzone value matches any of the retrieved subzone identifiers and setting the subzone factor to a second value when the computed subzone value does not match any of the retrieved subzone identifier.

* * * * *